US011727596B1

(12) United States Patent
Gafni et al.

(10) Patent No.: US 11,727,596 B1
(45) Date of Patent: *Aug. 15, 2023

(54) CONTROLLABLE VIDEO CHARACTERS WITH NATURAL MOTIONS EXTRACTED FROM REAL-WORLD VIDEOS

(71) Applicant: Meta Platforms Technologies, LLC, Menlo Park, CA (US)

(72) Inventors: Oran Gafni, Tel Aviv (IL); Lior Wolf, Herzliya (IL); Yaniv Nechemia Taigman, Raanana (IL)

(73) Assignee: Meta Platforms Technologies, LLC, Menlo Park, CA (US)

( * ) Notice: Subject to any disclaimer, the term of this patent is extended or adjusted under 35 U.S.C. 154(b) by 134 days.

This patent is subject to a terminal disclaimer.

(21) Appl. No.: 17/322,160

(22) Filed: May 17, 2021

Related U.S. Application Data

(63) Continuation of application No. 16/384,694, filed on Apr. 15, 2019, now Pat. No. 11,017,560.

(51) Int. Cl.
*G06T 7/73* (2017.01)
*G06N 3/08* (2023.01)
(Continued)

(52) U.S. Cl.
CPC ............. *G06T 7/75* (2017.01); *G06N 3/045* (2023.01); *G06N 3/08* (2013.01); *G06N 20/20* (2019.01);
(Continued)

(58) Field of Classification Search
CPC ... G06T 7/75; G06T 7/20; G06T 2207/20084; G06T 2207/20081; G06N 20/20; G06N 3/08; G06N 3/0454
See application file for complete search history.

(56) References Cited

U.S. PATENT DOCUMENTS 10,529,137 B1 * 1/2020 Black .................. G06V 40/103
10,592,780 B2 3/2020 Gurvich et al.
(Continued)

OTHER PUBLICATIONS

Prediction of Human Body Motion from Video Sequences—2018 (Year: 2018).*
(Continued)

*Primary Examiner* — Nizar N Sivji
(74) *Attorney, Agent, or Firm* — Shumaker & Sieffert, P.A.

(57) ABSTRACT

A video generation system is described that extracts one or more characters or other objects from a video, re-animates the character, and generates a new video in which the extracted characters. The system enables the extracted character(s) to be positioned and controlled within a new background scene different from the original background scene of the source video. In one example, the video generation system comprises a pose prediction neural network having a pose model trained with (i) a set of character pose training images extracted from an input video of the character and (ii) a simulated motion control signal generated from the input video. In operation, the pose prediction neural network generates, in response to a motion control input from a user, a sequence of images representing poses of a character. A frame generation neural network generates output video frames that render the character within a scene.

20 Claims, 15 Drawing Sheets

(51) Int. Cl.
G06N 20/20 (2019.01)
G06T 7/20 (2017.01)
G06N 3/045 (2023.01)

(52) U.S. Cl.
CPC ...... *G06T 7/20* (2013.01); *G06T 2207/20081* (2013.01); *G06T 2207/20084* (2013.01)

(56) References Cited

U.S. PATENT DOCUMENTS

| | | | |
|---|---|---|---|
| 11,417,136 | B2* | 8/2022 | Ran .................. A63B 69/38 |
| 2011/0043625 | A1 | 2/2011 | Cobb et al. |
| 2016/0125255 | A1 | 5/2016 | Saitwal et al. |
| 2017/0094192 | A1 | 3/2017 | Adsumilli et al. |
| 2017/0318360 | A1* | 11/2017 | Tran .................. A63F 13/212 |
| 2018/0161986 | A1 | 6/2018 | Kee et al. |
| 2019/0251401 | A1* | 8/2019 | Shechtman ...... G06V 30/19173 |
| 2020/0151291 | A1* | 5/2020 | Bhattacharyya ..... G01C 21/203 |
| 2020/0167650 | A1* | 5/2020 | Lamy-Poirier ...... G06N 3/0454 |
| 2020/0193152 | A1 | 6/2020 | Vesdapunt et al. |
| 2020/0312037 | A1* | 10/2020 | Kopeinigg .............. G06T 7/70 |

OTHER PUBLICATIONS

3D Ego-Pose Estimation via Imitation Learning (Year: 2018).
Chan et al. "Everybody Dance Now" arXiv:1808.07371, UC Berkeley, Aug. 22, 2018, 12 pp.
Chao et al. "Generative Models for Pose Transfer" arXiv:1806. 09070, Jun. 24, 2018, 8 pp.
Deep Learning in Robotics (Year: 2017).
Dynamic Visual Sequence Prediction with Motion Flow Networks (Year: 2018).
Esser et al. "Towards Learning a Realistic Rendering of Human Behavior" HCI, IWR, Heidelberg University, ECCV-18 submission ID 8, Sep. 10, 2018, 17 pp.
Finn et al. "Unsupervised Learning for Physical Interaction through Video Prediction" arXiv:1605.07157, Oct. 17, 2016, 12 pp.
Fragkiadaki et al. "Recurrent Network Models for Human Dynamics" arXiv:1508.00271, Sep. 29, 2015, International Conference on Computer Vision 2015, 9 pp.
Generating Videos with Scene Dynamics (Year: 2016).
Goodfellow et al. "Generative Adversarial Networks" arXiv:1406. 2661, Jun. 10, 2014, 9 pp.
Guler et al. "DensePose: Dense Human Pose Estimation in the Wild", Feb. 1, 2018, IEEE Conference on Computer Vision and Pattern Recognition, arXiv:1802.00434, 12 pp.
Hao et al. "Controllable Video Generation with Sparse Trajectories" Mar. 29, 2018, Computer Vision and Pattern Recognition (CVPR), Salt Lake City, UT, 10 pp.
Holden et al. "Phase-Functioned Neural Networks for Character Control" ACM Transactions on Graphics, vol. 36, No. 4, Article 42, Jul. 2017, 13 pp.

Ioffe et al. "Batch Normalization: Accelerating Deep Network Training by Reducing Internal Covariate Shift" arXiv:1502.03167, Mar. 2, 2015, 11 pp.
Isola et al. "Image-to-Image Translation with Conditional Adversarial Networks" IEEE Conference on Computer Vision and Pattern Recognition (2017), Nov. 26, 2018, 17 pp.
Johnson et al. "Perceptual Losses for Real-Time Style Transfer and Super-Resolution" arXiv:1603.08155, Mar. 27, 2016, Stanford University, 18 pp.
Kanazawa et al. "Learning 3D Human Dynamics from Video" arXiv:1812.01601, May 16, 2019, 12 pp.
Kingma et al. "Adam: A Method for Stochastic Optimization" arXiv:1412.6980, Jan. 30, 2017, 3rd International Conference for Learning Representations, San Diego, 2015.
Mao et al. "Least Squares Generative Adversarial Networks" arXiv:1611. 04076, Apr. 5, 2017, 16 pp.
Mirza et al. "Conditional Generative Adversarial Nets" arXiv:1411. 1784, Nov. 6, 2014, 7 pp.
Nair et al. "Rectified Linear Units Improve Restricted Boltzmann Machines" Proceedings of the 27th international conference on machine learning (ICML), May 8, 2010, 8 pp.
Oh et al. "Action-Conditional Video Prediction using Deep Networks in Atari Games" arXiv:1507.08750, Dec. 22, 2015, 26 pp.
Peng et al. "SFV: Reinforcement Learning of Physical Skills from Videos" ACM Trans. Graph. 37, 6, Article 178, Nov. 2018, 17 pages. https://doi.org/10.1145/3272127.3275014.
Pose Guided Human Video Generation (Year: 2018).
Pumarola et al. "Unsupervised Person Image Synthesis in Arbitrary Poses" arXiv:1809.10280, Sep. 27, 2018, 9 pp.
Simonyan et al. "Very Deep Convolutional Networks for Large-Scale Image Recognition" arXiv:1409.1556, Apr. 10, 2015, ICLR 2015, 14 pp.
Ulyanov et al. "Instance Normalization: The Missing Ingredient for Fast Stylization" arXiv:1607.08022, Nov. 6, 2017, 6 pp.
Vondrick et al. "Generating Videos with Scene Dynamics" arXiv:1609. 02612, Oct. 26, 2016, 10 pp.
Wang et al. "High-Resolution Image Synthesis and Semantic Manipulation with Conditional GANs" IEEE Conference on Computer Vision and Pattern Recognition, Aug. 20, 2018, 14 pp.
Wang et al. "Video-to-Video Synthesis" https://tcwang0509.github. io/vid2vid/paper_vid2vid.pdf (last accessed Sep. 4, 2019), NeurIPS, Dec. 4, 2018, 14 pp.
Yang et al. "Pose Guided Human Video Generation" arXiv:1807. 11152, Jul. 30, 2018, 16 pp.
Zhu et al. "Unpaired Image-to-Image Translation using Cycle-Consistent Adversarial Networks" arXiv:1703.10593, Nov. 15, 2018, 18 pp.
Prosecution History of U.S. Appl. No. 16/384,694 dated Sep. 24, 2020 through Jan. 27, 2021, 35 pp.
U.S. Appl. No. 16/384,694, filed Apr. 15, 2019, Facebook Technologies, LLC (inventor: Gafni), entitled "Controllable Video Characters With Natural Motions Extracted From Real-World Videos".
Balakrishnan G., et al., "Synthesizing Images of Humans in Unseen Poses," IEEE Conference on Computer Vision and Pattern Recognition, Apr. 20, 2018, 9 pages.

* cited by examiner (a)  (b)  (c)

(a)  (b)

CONTROLLABLE VIDEO CHARACTERS WITH NATURAL MOTIONS EXTRACTED FROM REAL-WORLD VIDEOS

This application is a continuation of U.S. application Ser. No. 16/384,694, filed Apr. 15, 2019, the entire content of which is herein incorporated by reference.

BACKGROUND

Video generation tools are commonly used to create, manipulate, and process video data. Most video generation tools provide a variety of video processing functions, ranging from image processing tasks, such as image filtering, shading, and color enhancement, to more complex tasks like object recognition.

SUMMARY

This disclosure describes various examples of a video generation system that is able to extract one or more characters from a video, re-animate the characters, and generate a new video in which the extracted characters are controlled according to a motion control input. As described herein, the techniques utilize a first neural network, a pose prediction network, that enables the creation of long sequences of detailed coarsely-controlled poses in an autoregressive manner. These poses are converted into a video sequence by a second neural network, a frame generation network, in a manner that enables the careful handling and replacement of the background, which can be crucial for many applications. The techniques are general enough to enable the extracted character(s) to be positioned and controlled within a new background scene different from the original background scene of the source video. Moreover, as described, the new background for a controllable character may also be dynamic such that the scene changes as the character is being manipulated by a user.

In one example, a video generation system comprises a pose prediction neural network and a frame generation neural network. The pose prediction neural network comprises a pose model trained with (i) a set of character pose training images extracted from an input video of the character and (ii) a simulated motion control signal generated from the input video. In operation, the pose prediction neural network generates, in response to a motion control input from a user, a sequence of images representing poses of a character. The frame generation neural network generates output video frames that render the character within a scene. By operating in integrated fashion, the neural networks of the video generation system are able to extract a controllable model from a conventional input video and generate, using the controllable model, realistic image sequences of the character according to arbitrary, user-defined control signals.

In another example, a method comprises generating, with a pose prediction neural network and in response to a motion control input, a sequence of poses of a character, wherein each of the poses comprises image data representing a pose for the character, and wherein the pose prediction neural network comprises a pose model trained with (i) a set of character pose training images extracted from an input video of the character and (ii) a simulated motion control signal generated from the input video. The method further comprises generating, with a frame generation neural network, output video frames that render the character within a scene.

In another example, a computer-readable storage medium comprises instructions that configure one or more programmable processors to process an input video to extract a set of character pose training images from an input video by separating image data associated with the character from background image data for a plurality of frames of the input video, and to process the input video to compute a simulated control signal as a sequence of two-dimensional displacement vectors representing changes to a center of mass for the character over the character pose training images. The instructions further configure the processors to apply, as inputs, (i) the set of character pose training images extracted from an input video of the character and (ii) the simulated motion control signal generated from the input video to train a pose model of a pose prediction neural network. In addition, the instruction configure the processor to generate, with the pose prediction neural network and in response to a motion control input from a user, a sequence of poses of a character, wherein each of the poses comprises image data representing a pose for the character, and generate, with a frame generation neural network, output video frames that render the character within a scene.

The techniques various technical advantages and practical applications, such as enabling the generation of video games or artificial reality content with realistic high-resolution images and controllable characters directly from input videos. The pose prediction network enables guided pose generation for a specific trained domain (e.g., a tennis player, a dancer, etc.), where guiding takes the form of 2D or 3D motion controls, while the frame generation network allows the incorporation of a photo-realistic generated character into a desired environment.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like symbols indicate like elements throughout the drawings and specification.

DETAILED DESCRIPTION

Figure 1:
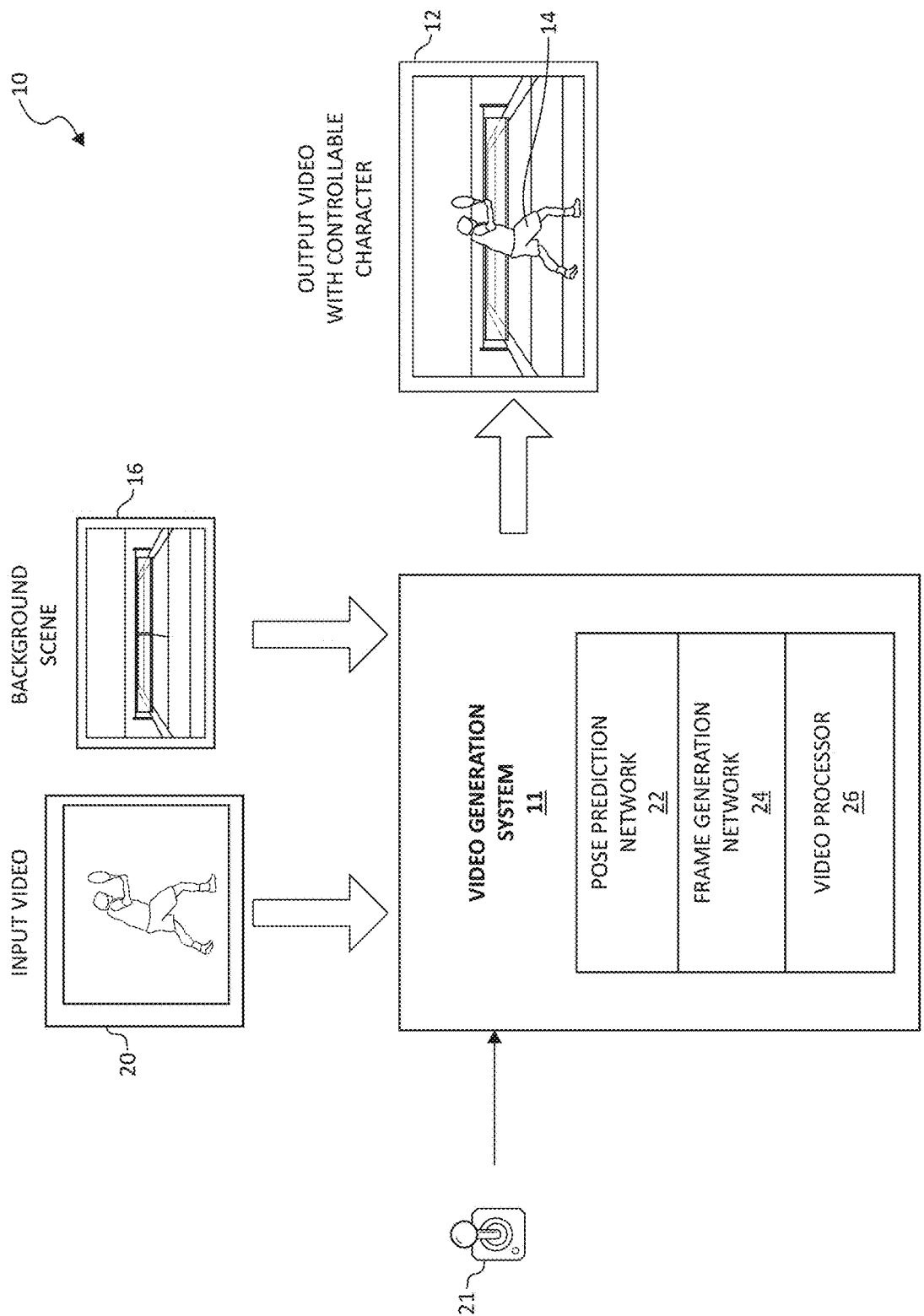
FIG. 1 is a block diagram illustrating an example system in which a video generation system generates an output video having a controllable character in accordance with the techniques described herein.

Techniques are described by which a machine learning system processes video to extract imagery of a character in motion, such as a human performing an activity (e.g., an individual playing tennis), and constructs pose prediction and frame generation models capable of dynamically generating new videos in which the character is controllable responsive to user-defined input. In some examples, the machine learning system may process the video to further extract imagery of one or more other objects in motion, such as a tennis racket used by an individual playing tennis. As examples, the techniques may be advantageous for systems, such as artificial reality systems or video generation platforms, for generating new types of realistic and personalized videos having controllable characters extracted from videos.

In one example implementation, the machine learning system utilizes a pair of machine learning networks. The first network, referred to herein as a pose prediction network, processes video of a character in motion to train a machine learning model with poses of the character that correlate to movements of the character within an environment represented in the video. Once trained, the pose prediction network may then estimate, from a current pose of the character and a control signal indicative of a desired movement of the character, a next pose of the character using the trained machine learning model. The second network of the machine learning system, referred to as a frame generation network, transforms an estimated pose to a character that is localized in a specific background. That is, the frame generation network may iteratively map the current pose, the next pose (as estimated by the first network), and a series of background images to generate multiple output frames that make up an artificially-generated video of the character moving within an environment. In some examples, the pose prediction network and frame generation network apply the above processing steps to the character as well as to an object represented in the video. The pose prediction network may in this way estimate the next pose of the character in association with the object using the trained machine learning model, and the frame generation network may transform this estimation to generate a frame having a combined pose and object that is localized in a specific background.

In some examples, the pose prediction network utilizes an architecture for training a pose prediction model to manipulate a pose in an autoregressive manner based on an input stream of control signals indicative of a desired displacement of the character in space. In general, the pose prediction network operates by using the control signals to condition the layers of a latent space transformation network of a generator network. For example, the pose prediction network may include a set of conditioned residual blocks that are each conditioned, at training, by a linear projection of the center-mass differences in the location of the character between consecutive frames. At inference time, the pose prediction network can then apply the trained pose prediction model to generate the next pose in an auto-regressive manner, conditioned on the control signals that provide intended directions for the character and that function as input signals to the trained conditioned residual blocks to provide predicted outputs that, as a result, correlate to the poses of the character for similar movements within the video on which the pose prediction network trained. During training, in some instances, one or more discriminator networks evaluate the output poses generated by the generator network against ground truth poses, where the discriminator networks and the generator network form an overall generative adversarial network. In some examples, the pose prediction network and frame generation network apply the above processing steps to the character as well as to an object represented in the video.

In general, the frame generation network transforms a predicted pose for a character to a rendered character that is localized in a specific part of the output image and embedded in a background to generate an output frame. In general, the frame generation network generates each output frame based on a previous pose, a current pose, and a background image (which may be static or dynamic). Besides rendering the raw image output for the output frame, the frame generation network may also generate a blending mask for blending the rendering raw image with the desired background image. In this way, the frame generation network can blend effects of a character on the background, such as shadows, with the background itself. In some examples, the frame generation network applies the above processing steps to the character as well as to an object represented in the video. By employing regularization terms over the generated blending masks and raw image output, the frame generation network causes masking to take place at relevant locations affected by the character. In addition, the discriminator of the frame generation network may focus on the rendered character to reduce or eliminate reliance on separate feature-enhancing techniques, such as face-GANs (in the case of human characters) or adding temporal loss to reduce background motion.

FIG. 1 is a block diagram illustrating an example system 10 in which a video generation system 11 generates an output video 12 having a controllable character 14 in accordance with the techniques described herein. As shown, video generation system 11 receives input video 20, which contains one or more characters. Video generation system 11 processes input video 20 to extract one or more characters or other objects from the video, re-animate the character, and generate output video 12 as a new video in which the extracted character(s) 14 are controllable in response to input from video generation system 11. That is, video generation system 11 learns the motion of a character from input video 20, such that new videos (e.g., output video 12) of that character can be rendered based on a user provided motion sequence. As other examples, video generation system 11 may be utilized to incorporate motion of the character in other applications, such as integration of natural motion of the character within artificial reality systems in response to a control sequence.

As described herein, in some example implementations, video generation system 11 video generation system 11 may further receive, as input, one or more background scene(s) 16, which may take the form of individual images or video. Video generation system 11 enables extracted character(s) 14 to be positioned and controlled within a new background scene(s) 16 different from an original background scene of input video 20. Moreover, as described, the new background for controllable character 14 within output video 12 may be dynamic such that the scene changes as the character is being manipulated by a user.

As such, video generation system 11 provides a general and convenient way for users to control the dynamic development of a given video. As video generation system 11 extracts the one or more characters from input video 20, each character is associated with a sequence of displacements determined from the video. In one implementation, a control sequence simulating an input control for the character is computed as a trajectory of a center of mass for the character over the frames of input video 20. Given input video 20 representing a new motion sequence (e.g., a new trajectory for a character or other object), video generation 11 is able to generate a realistic video of character 14 placed in front of background scene(s) 16.

As shown in FIG. 1, example implementations of video generation system 11 employs two separately trained neural networks applied in a sequential manner. Pose prediction network 22 is a neural network trained for manipulating a given pose in an autoregressive manner, based on an input stream of one or more control signals provided by video generation system 11, to predict a new pose for character 14. That is, pose prediction network 22 maps a current pose and a control signal to the next pose. Frame generation network 24 is a second neural network trained for generating a high-resolution realistic video frame for output video 12 utilizing, as input, the predicted pose produced by pose prediction network 22 along with a background image data from background scene(s) 16. In other words, frame generation network maps the current pose, the new pose computed by the pose prediction network, and a given background to an output frame. By operating in integrated fashion, the neural networks of video generation system 11 are able to extract a controllable model from a conventional input video and generate, using the controllable model, realistic image sequences of the character according to arbitrary, user-defined control signals.

The techniques described herein may provide various technical advantages and practical applications, such as enabling the generation of video games or artificial reality content with realistic graphics from input videos. Pose prediction network 22 enables guided character-pose generation for a specific trained domain (e.g., a tennis player, a dancer, etc.), where guiding takes the form of 2D or 3D motion controls, while frame generation network 24 allows the incorporation of a photo-realistic generated character into a desired environment.

Moreover, as described herein, for frame generation network 24 to replace a background for character 14 with background scene(s) 16, video generation system 11 processes input video 20 to separate the character from the surroundings, which can be challenging without merely embedding the character into the same learned background or pasting the generated character into a background with noticeable artifacts. Further, as described herein, the techniques provide technical advantages in situations where the separation of the character from input video 20 is difficult, such as where certain visual effects, such as shadows, blend the character's visual effect with background information. Moreover, the techniques can be applied in practical applications where the control signal can be arbitrary and can lead character 14 to poses that are not covered in the training set. Further, the techniques accommodate generated sequences that would otherwise easily drift by accumulating small errors over time.

Although described for purposes of example with respect to a single pose prediction network 22 operating to provided predicted poses as input to frame generation network 24, other example implementations may include multiple pose prediction networks trained with pose training images extracted from one or more input video for different characters or objects. In such embodiments, each pose prediction network is trained as described herein and, in response to one or more input control signals, outputs a predicted pose for the respective object. Frame generation network 24 operates to produce composite video frames in which the plurality of objects are rendered and blended into background scene 16 for output as output video 14.

Figure 2:
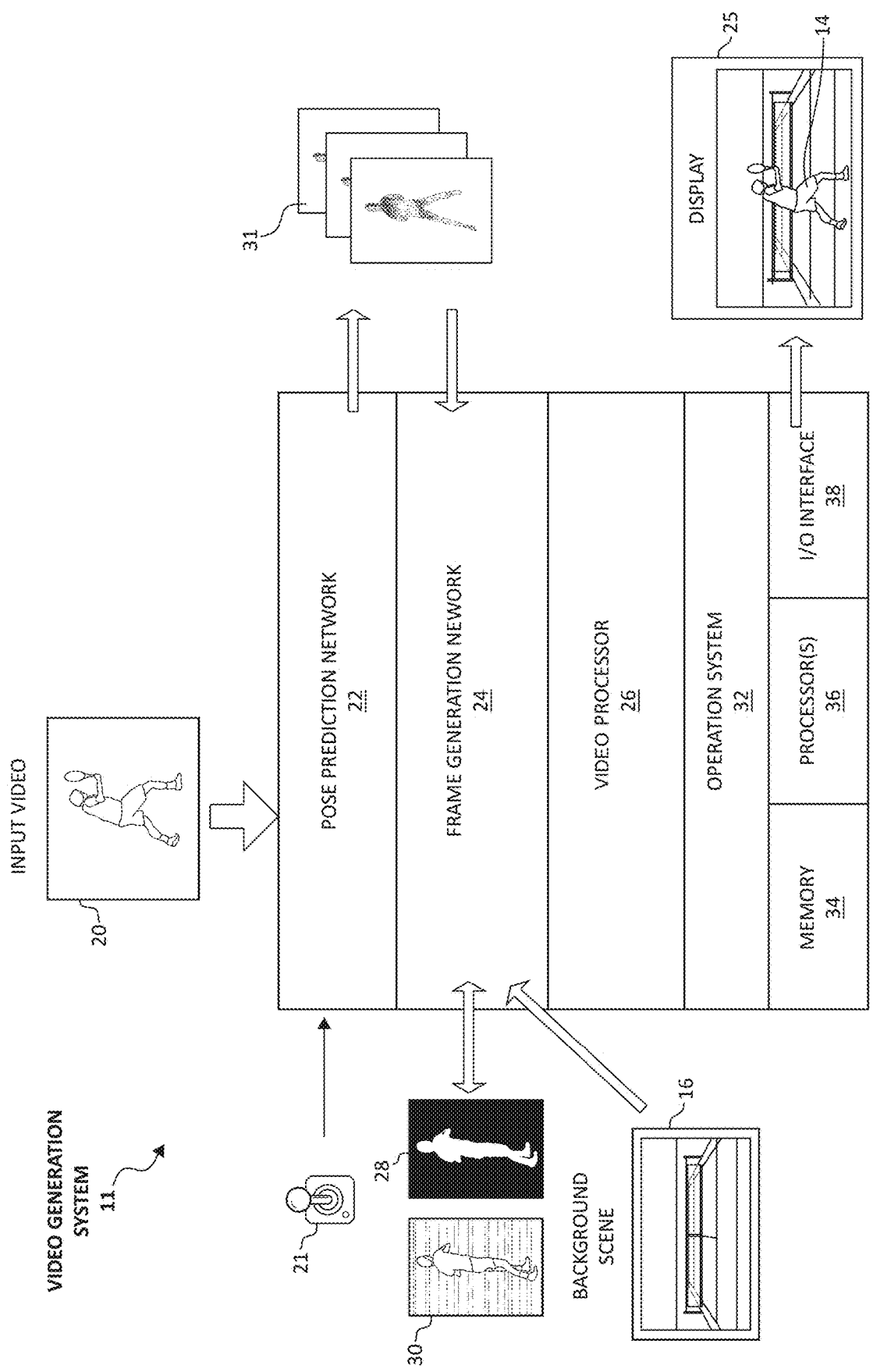
FIG. 2 is a block diagram illustrating in further detail an example video generation system in accordance with the techniques of this disclosure.

FIG. 2 is a block diagram illustrating in further detail an example video generation system 11 in accordance with the techniques of this disclosure. In this example, video generation system 11 includes one or more processors 36 and memory 34 that, in some examples, provide a computer platform for executing an operation system 32. In turn, operating system 32 provides a multitasking operating environment for executing one or more software components, such as pose prediction network 22 and frame generation network 24. Processors 36 and/or other hardware of video processing system 12, such as a graphics processor having video memory, communicate video data to be rendered by electronic display 40, which may be any form of visual output device, such as a computer monitor.

As shown in FIG. 2, and as further described herein, pose prediction network 22 receives input video 20 of one or more subject characters or other objects and processes input video 20 to train an underlying neural network to that is capable of generating a sequence of images each depicting corresponding pose 31 of a character in response to input from directional control 21, which may be a joystick, one or more input keys, buttons on a handheld controller, recognized gestures or motions in an artificial reality system or any other form of device capable of providing an indication of a desired direction of movement for a character or other object. Each pose 31, for example includes image data representing a particular pose (e.g., stance, orientation or expression) of the character's body.

Frame generation network 24 receives the sequence of character poses 31 from pose prediction network 22 and, in some examples, background scenes 16. Based on a current pose (i.e., a current one of poses 31 current being used for output frame generation) and a subsequent pose to which to transition, frame generation network 24 generates a raw output image frame 30 and a blending mask 28 for rendering character motion from the current pose to the subsequent pose. Frame generation network 24 applies the generated mask 28 to blend the raw output image frame 30 with the desired background scene 16 so as to render the final output frame 14 as a composite image on display 25.

Figure 3:
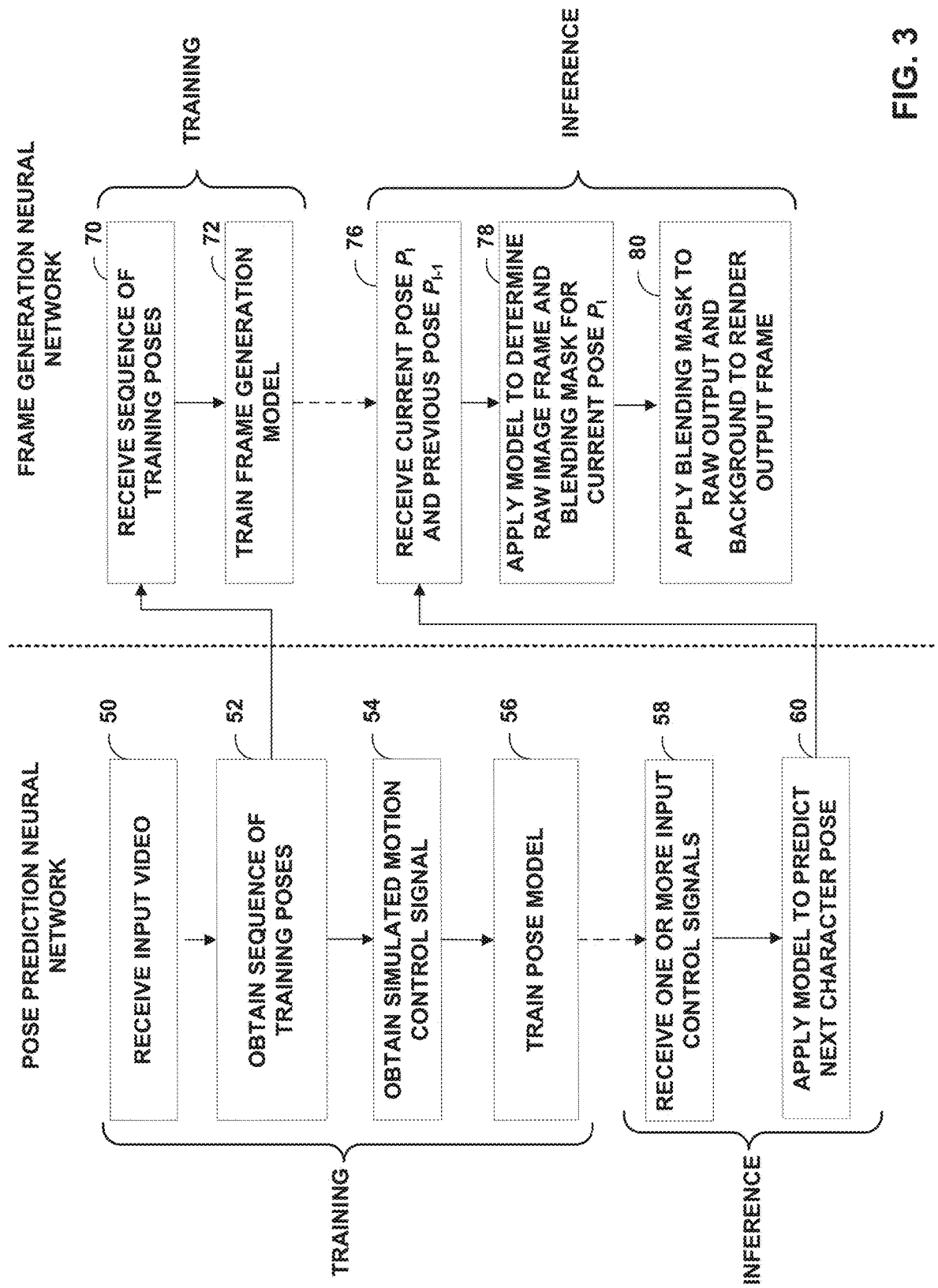
FIG. 3 is a flowchart illustrating example operation of the video generation system described herein.

FIG. 3 is a flowchart that further illustrates example operation of video generation system 11. As shown in FIG. 3 operation of each pose prediction network 22 and frame generation network 24 includes respective training phases during which the underlying model of each neural network is trained and inference phases during which the neural networks are operational to dynamically generate output video 12 as a new video in which the extracted character(s) 14 are controllable in response to input from video generation system 11.

During the training phase, pose prediction network 22 receives input video 20 of one or more subject characters, and in some cases of other objects (50). Video processor 26 may include a separate neural network, such as a dense human pose estimation network (e.g., DensePose) or other human pose estimation network, to process input video 20 to extract the one or more characters from input video 20 by, for each frame, separating the image data associated with the character from the background image data to generate a set of training images (referred to as character pose training images). In this way, video processor 26 extracts a sequence of training poses for the character, where each training pose comprises an image that renders a position and orientation of the character. Pose prediction network 22 may obtain the sequence of training poses for the character, as extracted by the separate neural network (52).

In some cases, in addition to the pose, a separate object channel (in addition to the three RGB channels encoding the pose) may be used to generate an object or hand-held object (e.g. tennis racket). Video processor 26 may include a neural network to process, for training, input video 20 to perform semantic segmentation of the input video 20 and extract the object using the semantic segmentation of that object in the input video 20. The object channel may then be concatenated to the pose channels for the pose prediction network 22, and combined to the pose channels for the frame generation network 24, by (for instance) summing the object channel with each of the three RGB channels encoding the pose.

Video processor 26 processes the character image data extracted from each frame of the input video to compute a simulated 2D motion control signal representative of the character's 2D movement within input video 20. More specifically, video processor 26 processes the character image data to compute a center of mass for the character at each frame, where the center of mass is a 2D location within the respective frame. Based on the center of masses, video processor 26 computes the simulated 2D motion control signal for the character as a sequence of 2D displacements of the character's center of mass over the sequence of frames of input video 20.

Pose prediction network 22 obtains the simulated 2D motion control signal (54). The extracted sequence of character poses and the simulated motion control signal are applied to train an underlaying pose model of pose prediction network 22 (56). In some examples, the image data for the training poses, as well as the resultant predicted poses, are scaled down to lower resolution (e.g., a width of 512 pixels), allowing pose prediction network 22 to focus on generation of pose representation of the character rather than high-resolution image generation. In this way, high-resolution output may be deferred to frame generation network 24. This may enable pose prediction network 22 to be trained much more effectively, resulting in a stable training process that generates natural dynamics, and leads to a significantly reduced inference time (post-training). Pose prediction network 22 may additionally train on self-generated poses, after training has started to stabilize.

In operation, pose prediction network 22 receives one or more input control signals representative of a desired direction of movement (58). For example, pose prediction network 22 may receive an input signal from directional control 21, where the input signal may indicate a 2D (X, Y) vector of desired movement. The user may provide an initial pose, $p_0$. In response to the motion control input, pose prediction network 22 determines a next pose for the character (60). That is, the 2D input vector from video generation system 11 is applied as inputs to the trained pose model of pose prediction network 22 to predict, in an autoregressive manner, a next pose for the character, where the next predicted pose (also referred to herein as a predicted pose image) is a 2D or 3D image representation of the pose and orientation of the character as learned from the sequence of poses extracted from input video 20.

During the training phase, frame generation network 24 is trained to transform a predicted character pose into an output frame in which the predicted character pose is localized in a specific part of an output image and embedded in a given, possibly dynamic, background image. As input, frame generation network 24 utilizes the sequence of character poses extracted from input video 20 (70). However, rather than utilizing scaled down versions of the images for the character poses, frame generation network 24 may be trained on full, high-resolution image data of the character data over the sequence of frames or, on scaled-down versions of the character poses, to match the image resolution, as produced by the pose prediction network. As explained in further detail below, the high-resolution sequence of character poses is applied as inputs to train the underlying frame generation model for frame generation network 24 (72). As further described above, the sequence of character poses are applied to the underlying frame generation model of frame generation network 24 to learn blending masks and raw output frames for achieving a given pose. Moreover, during training, a multi-scale discriminator of frame generation network 24 is trained to discriminate between visual effects in the input video that are due to the character and visual effects that are independent from the character. Frame generation network 24 generates the blending mask to prioritize inclusion of character-based effects on the background within the composite image and the exclude character-independent effects on the background.

In operation, frame generation network 24 receives from pose prediction network 22 the sequence of poses 31, each including 2D or potentially 3D images providing a representation of a pose of the character (76). Using the current and previous poses as inputs to the trained model, frame generation network 24 generates a sequence of raw image frames and a blending mask for rendering character motion from the previous pose to the current pose (78). In other words, frame generation network 24 generates, for a sequence of poses produced by the pose model of pose prediction network 22 in response to a motion control signal, a sequence of raw image frames depicting poses of the character and a set of respective blending mask images. For each predicted pose, frame generation network 24 applies the generated blending mask to blend the raw output with the desired background so as to render a composite image for the final output frame (80). In this way, frame generation network 24 generates the output video as a sequence of composite images by application of each blending mask image to a background image and the respective raw image frame.

Figure 4:
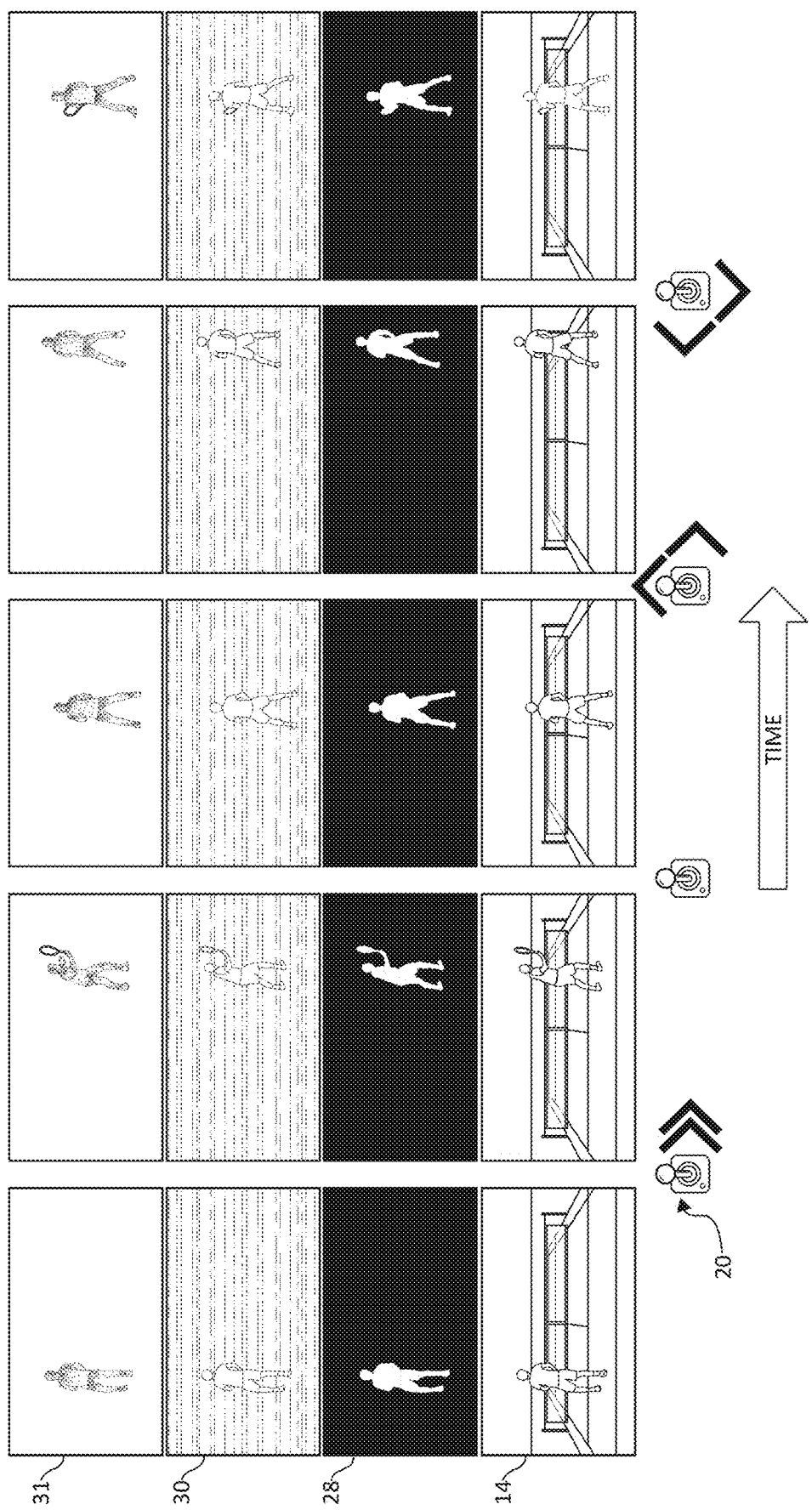
FIG. 4 illustrates four rows of examples images generated by a video generation system over a time progression from left to right, according to techniques described herein.

FIG. 4 illustrates four rows of examples images generated by video generation system 11 in response to direction control over a time progression from left to right. The sequence of images representing the pose of the character (i.e. poses 31), shown in the first row, is computed and output by pose prediction network 22, based on the pose of the previous frame, so that the motion matches the control signal (shown at the bottom of FIG. 4) illustrated by the joystick (i.e., direction control 21). In FIG. 4, the second row of images depicts the character's appearance (i.e., raw output image frame 30) as generated by frame generation network 24, which also generates blending masks 28 shown on the third row. The final high-resolution frames of output video 14, shown in the last row, are generated by frame generation network 24 by blending a given background and raw output image frames 30 in accordance with blending masks 28.

Further example details of the operation of video generation system 11 are described below. In general, frame generation network 24 generates a video sequence with frames $f_i$ (output video 14) based on a sequence of poses $b_i$ (poses 31) and a sequence of background images $b_i$ (scenes 16), where i=1, 2, . . . is the frame index. The creation process implemented by frame generation network 24 also involves a sequence of spatial masks $m_i$ (masks 28) that determine which parts of the background are replaced by synthesized image information $z_i$ (raw output frames 30 produced by frame generation network 24).

To generate output video 14, video generation system 11 receives, as input, a pose at time zero: $p_i$, the sequence of background images $b_i$, which can be static, i.e., •$ib_i$=b, and a sequence of control signals $s_i$, e.g., input from direction control 21. In various examples, the control signal may comprise the desired 2D displacement of the animated character.

In general, video generation system 11 integrates an autoregressive pose model coupled with a frame rendering mechanism. Pose prediction network 22 creates a sequence of poses, each pose $p_i$ is dependent on the previous pose $p_{i-1}$ as well as on the current control signal $s_i$. Frame generation network 24 generates the current frame $f_i$, based on the current background image $b_i$, the previous pose $p_{i-1}$, and the current pose $p_i$. This rendering process includes the generation of both a raw image output $z_i$ and a blending mask $m_i$, where $m_i$ has values between 0 and 1, and 1−$m_i$ denotes the inverted mask.

Specifically, the high-level processing is given by the following three equations:

$$p_i = P2P(p_{i-1}, s_i) \quad (1)$$

$$(z_i, m_i) = P2F(p_{i-1}, p_i) \quad (2)$$

$$f_i = z_i \odot m_i + b_i \odot (1 - m_i) \quad (3)$$

where 'P2P' and 'P2F' refer to pose prediction network 22 and frame generation network 24, respectively. P2F returns a pair of outputs that are then linearly blended with the desired background using the per-pixel multiplication operator $\odot$.

In examples in which video generation system 11 operates to generate frames each having a combined pose and object localized in a background, pose prediction network 22 creates a sequence of poses and objects. Each pose and object pair [$p_i$,$obj_i$] is dependent on the previous pair [$p_{i-1}$, $obj_{i-1}$], as well as on the current control signal $s_i$. Frame generation network 24 generates the current frame $f_i$ based on the current background image $b_i$, the previous combined pose and object $p_{i-1}$+$obj_{i-1}$, and the current combined pose and object $p_i$+$obj_i$. This rendering process includes the generation of both a raw image output $z_i$ and a blending mask $m_i$, where $m_i$ has values between 0 and 1, and 1−$m_i$ denotes the inverted mask.

In these cases, the high-level processing is given by the following three equations:

$$[p_i, obj_i] = P2P([p_{i-1}, obj_{i-1}], s_i) \quad (4)$$

$$(z_i, m_i) = P2F([p_{i-1} + obj_{i-1}, p_i + obj_i]) \quad (5)$$

$$f_i = z_i \odot m_i + b_i \odot (1 - m_i) \quad (6)$$

P2F returns a pair of outputs that are then linearly blended with the desired background using the per-pixel multiplication operator $\odot$.

Figure 5A:
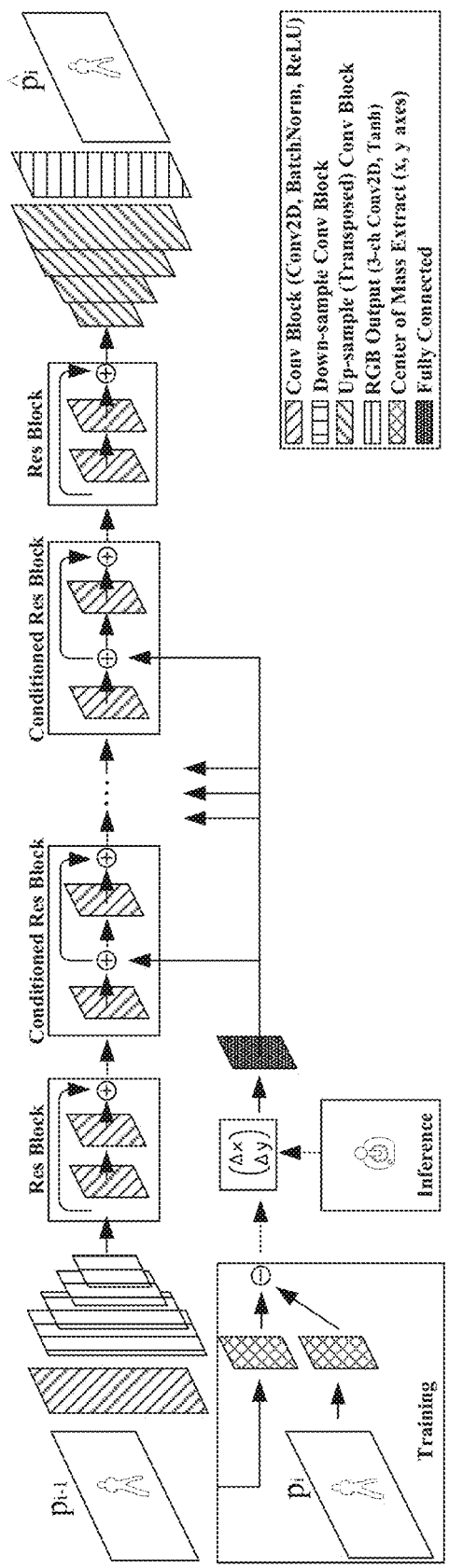
FIGS. 5A-5B are block diagrams each illustrating an example implementation of a pose prediction neural network in accordance with the techniques described herein.
Figure 5B:
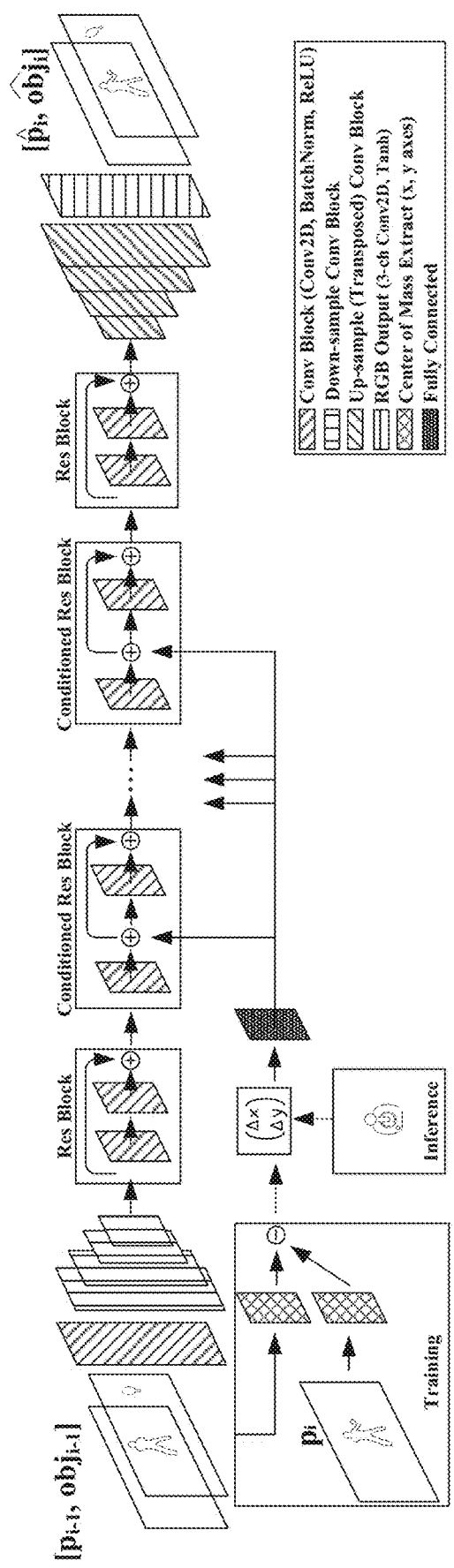

FIGS. 5A-5B are block diagrams each illustrating an example implementation of pose prediction network 22 in accordance with the techniques described herein. FIG. 5A depicts frame generation for a pose without incorporating an object in addition to the pose. FIG. 5B depicts frame generation with a combined pose and object. In general, pose prediction neural network 22 includes an encoder composed of a convolutional layer, followed by convolutions with batch normalization and rectified linear unit (ReLU) activations. The latent space combines a sequence of $n_r$ residual blocks. The decoder is composed of fractional strided convolutions with instance normalization and ReLU activations, followed by a single convolution terminated by a Tanh activation for the generated frame output.

Recall that pose prediction network 22 also receives the control signal as a second input (Eq. 1). In various examples, the control signal is a vector of dimension $n_d$=2 representing displacements along the x and y axes. This signal is incorporated to the network by conditioning the center $n_r$−2 blocks of the latent space. The conditioning takes place by adding to the activations of each residual block, a similarly sized tensor that is obtained by linearly projecting the 2D control vector $s_i$.

At training time, the middle $n_r$=7 residual blocks are conditioned by a linear projection (FC layer) of the center-mass differences between consecutive frames (in the x and y axes). At inference time, pose prediction network 24 generates the next pose in an autoregressive manner, conditioned on input directions.

In some examples, pose prediction network 22 contains a down-sampling encoder e, a latent space transformation network r and an up-sampling decoder u. The r network is conditioned on the control signal s.

$$P2P(p, s) = |u(r(e(p), s)) \quad (7)$$

The network r contains, as mentioned, $n_r$ blocks of two types: vanilla residual blocks (v), and conditioned blocks w.

$$r = v \circ \underbrace{w \circ w \ldots \circ w}_{n_r - 2 \text{ times}} \circ v, \quad (8)$$

The first and the last block are residual blocks of the form:

$$v(x) = f_2(f_1(x)) + x \quad (9)$$

where x denotes the activations of the previous layer, $f_1(x)$ and $f_2(x)$ are two consecutive convolutional layers.

The conditioned residual blocks are of the form $$w(x, s) = f_2(f_1(x) + g(s)) + f_1(x) + g(s) \quad (10)$$

where s is a 2D displacement vector and g is a fully connected network with a number of output neurons that equals the product of the dimensions of the tensor x.

In one example implementation, let Ck denote a Convolution-InstanceNorm-ReLU layer with k filters, each with a kernel size of 7×7, with a stride of 1. Dk denotes a Convolution-InstanceNorm-ReLU layer with k filters and a stride of 2, where reflection padding is used. Vk denotes a vanilla residual block with two 3×3 convolutional layers with the same number of filters on both layers. Wk denotes a conditioned residual block. Uk denotes a 3×3 Fractional-Strided-Convolution-InstanceNorm layer with k filters, and a stride of 0.5. The generator, i.e., the P2P network, can then be described as: C7s1-64, D128, D256, D512, D1024, V1024, W1024, W1024, W1024, W1024, W1024, W1024, W1024, V1024, U512, U256, U128, U64, C7s1-3.

In this example, the input images are scaled to a width size of 512 pixels, with the height scaled accordingly. The discriminators in this example may be two conditional adversarial neural networks, such as 'PatchGAN' described be Isola, et. al, *Image-to-Image Translation with Conditional Adversarial Networks*, IEEE Conference on Computer Vision and Pattern Recognition (2017), the entire contents of which are incorporated herein by reference. Moreover, the two discriminators may have identical architectures of C64, C128, C256, C512, working at the input resolution and a lower resolution, down-sampled by an average-2D pooling operation with a kernel size of 3 and a stride of 2.

During training, a least square generative adversarial network ('LSGAN') loss is applied to the generator and discriminator, which is an L1 feature matching loss that is applied over the discriminator's activations and, in some examples, over a trained VGG network, as detailed in the Ting-Chun Wang et. al, *High Resolution Image Synthesis and Semantic Manipulation with Conditional GANs*, IEEE Conference on Computer Vision and Pattern Recognition (2018), hereby incorporated herein by reference in its entirety.

The loss applied to the generator can then be formulated as:

$$\mathcal{L}_{P2P} = \sum_{k=1}^{2}\left(\mathcal{L}_{LS^k} + \lambda_D \mathcal{L}_{FM_D^k}\right) + \lambda_{VGG}\mathcal{L}_{FM_{VGG}} \quad (11)$$

where the networks were trained with $\lambda_D = \lambda_{VGG} = 10$. The LSGAN generator loss is calculated as:

$$\mathcal{L}_{LS^k} = \mathbb{E}_{(p_{i-1},s_i)}[(D_k(p_{i-1},P2P(p_{i-1},s_i))-1)^2] \quad (12)$$

The expectation is over the input pose and the associated $p_{i-1}$ and the associated $s_i$, and k is the index of the discriminator. The discriminator's feature matching loss compares the predicted pose with that of the generated pose, using the activations of the discriminator, and is calculated as:

$$\mathcal{L}_{FM_D^k} = \mathbb{E}_{(p_{i-1},p_i)}\sum_{j=1}^{M}\frac{1}{N_j}\|D_k^{(j)}(p_{i-1}, p_i) - D_k^{(j)}(p_{i-1}, P2P(p_{i-1}, s_i))\|_1 \quad (13)$$

with M being the number of layers, $N_j$ the number of elements in each layer, $p_{i-1}$ the input (previous) pose, $p_i$ the current (real) pose, P2P($p_{i-1}$,s) the estimated pose, and $D_k^{(j)}$ the activations of discriminator k in layer j.

The VGG feature-matching loss is calculated similarly, acting as a perceptual loss over a trained VGG classifier:

$$\mathcal{L}_{FM_{VGG}} = \sum_{j=1}^{M}\frac{1}{N_j'}\|VGG^{(j)}(p_i) - VGG^{(j)}(P2P(p_{i-1}, s_i))\|_1 \quad (14)$$

With $N_j'$ being the number of elements in the j-th layer, and $VGG^{(j)}$ the VGG classifier activations at the j-th layer. The loss applied to the discriminator can then be formulated as:

$$\mathcal{L}_{D^k} = \frac{1}{2}\mathbb{E}_{(p_{i-1},s_i)}[(D_k(p_{i-1}, P2P(p_{i-1}, s_i)))^2] + \frac{1}{2}\mathbb{E}_{(p_{i-1},p_i)}[(D_k(p_{i-1}, p_i) - 1)^2] \quad (15)$$

In some examples, the training sequences can be processed by employing a 'DensePose network' in order to extract the pose information from each frame. In this example, this pose information takes the form of an RGB image, where the 2D RGB intensity levels are a projection of the 3D UV mapping. Further example details of a DensePose neural network are described in Riza Alp Gil.ler et. al, *DensePose: Dense Human Pose Estimation In The Wild*, IEEE Conference on Computer Vision and Pattern Recognition (2018), hereby incorporated herein by reference.

By applying a binary threshold over the DensePose RGB image, a binary mask is created for the character in the video. From the binary mask of each frame i, the center of mass of the character ρi is computed. The control signal during training is taken as $s_i = p_i - p_{i-1}$.

The multi-scale discriminator thus receives, as input, binary-threshold versions of the pose, the generated character, and the original character. By receiving only the character (as cropped by the binary-threshold mask), the multi-scale discriminator can focus on the generated character only, rather than the rest of the background. The trained VGG classifier receives the full frame and performs the tasks of "understanding" the environmental surroundings (such as shadows) and blending the character into the background.

In some examples, due to the nature of the motion in the videos, the difference between consecutive frames in the full frame-rate videos (30fps) may be too small to create significant motion. This can result in learned networks that are biased into motionless poses. To address this problem, in some examples, pose prediction network 22 is trained with Δ=3 inter-frames intervals (where Δ=1 describes using consecutive frames). During inference, sample at 30fps and apply a directional conditioning signal that has a third of the average motion magnitude during training.

To cope with pose detection imperfections that occasionally occur, which in-turn impair the quality of the generated character, in some examples, a dedicated data augmentation method is employed in order to boost the robustness of pose prediction network 22. For example, a black ellipse of random size and location may be added to each input pose frame within the detection bounding box, resulting in an impaired pose, with characteristics that are similar to "natural" occurring imperfections.

Figure 6:
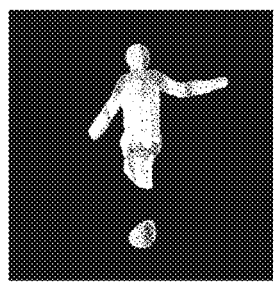
FIG. 6 is a series of images illustrating one example of an occlusion-based augmentation technique used to increase robustness during training the pose prediction network in accordance with techniques described herein.
Figure 6:
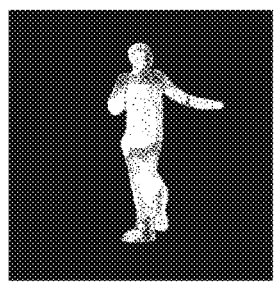
Figure 6:
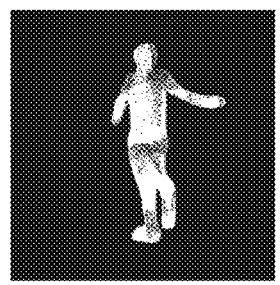
Figure 6:
Figure 6:
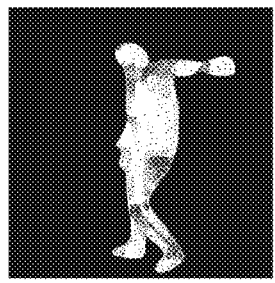
Figure 6:
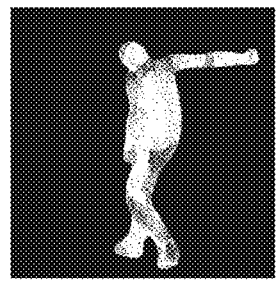

As one example, FIG. 6 is a series of images illustrated one example of an occlusion-based augmentation technique used to increase robustness during training pose prediction network 22. Each row of FIG. 6 is a single sample. (a)$p_{i-1}$ with part of the input pose frame occluded by a random ellipse inserted according to the technique, (b) the predicted pose $p_i^\wedge$, and (c) the ground truth pose $p_i$. As can be seen in FIG. 6, the output generated by pose prediction network 22 "fills in" the missing limbs, as well as predicts the next frame.

In situations where only a small quantity of training data may be available when extracted from a single video, additional data augmentation techniques may be applied. For example, for the control signal, each center-of-mass difference introduced into the network may be summed at training time with noise sampled from a small uniform distribution. Second, when extracting the pose from the frame, the scale of the bounding box may be modified slightly, by sampling from a uniform distribution, thus creating the effect of slightly zooming in and out.

Figure 7A:
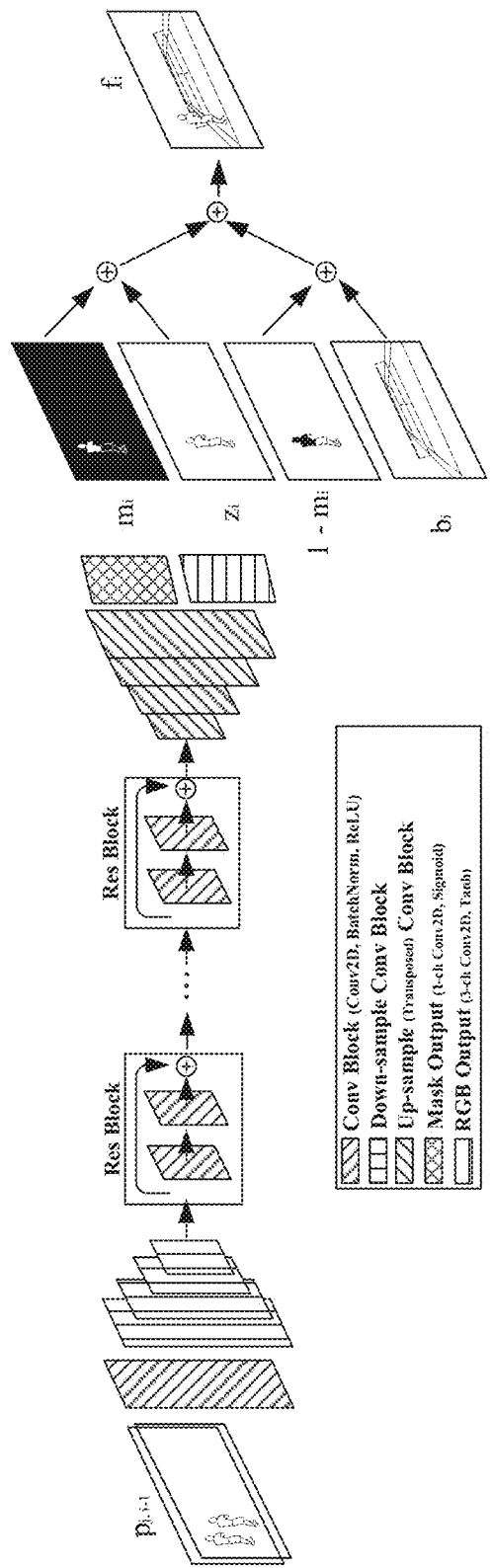
FIGS. 7A-7B are block diagrams each illustrating an example implementation of a frame generation neural network in accordance with the techniques described herein.
Figure 7B:
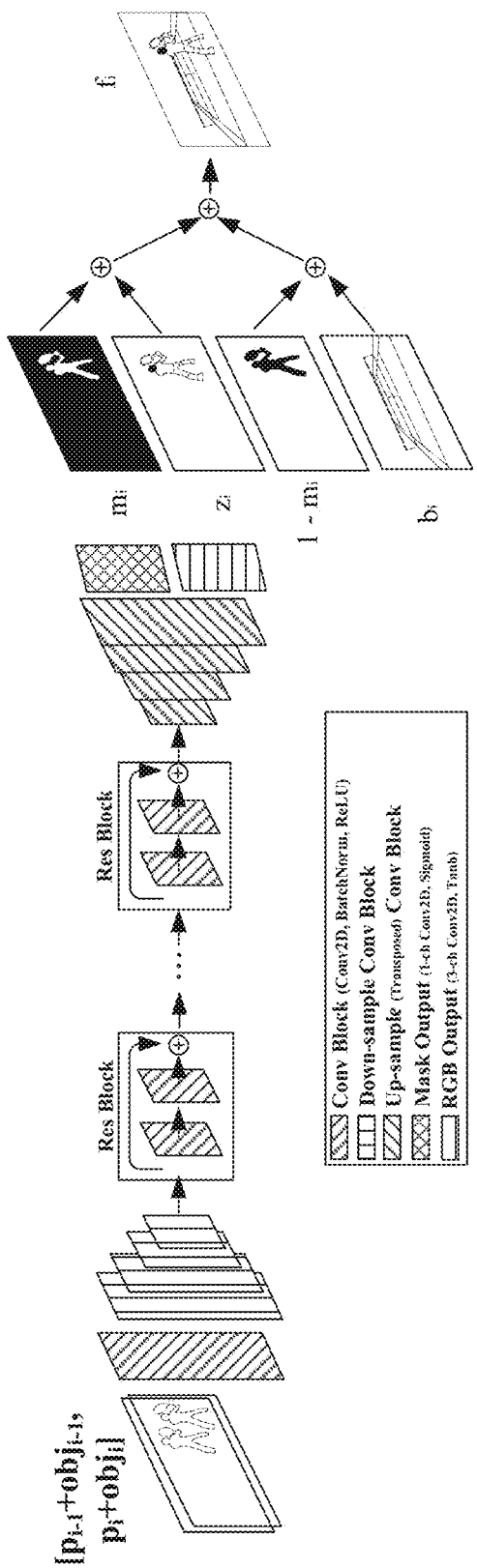

FIGS. 7A-7B are block diagrams each illustrating an example implementation of a frame generation neural network 24 in accordance with the techniques described herein. FIG. 7A depicts frame generation for a pose without incorporating an object in addition to the pose. In operation, for each input pose p=($p_i$,$p_{i-1}$), frame generation network 24 generates an RGB image ($z_i$) and a mask ($m_i$). FIG. 7B depicts frame generation with a combined pose and object. In operation, for each input pose and object pair p=[$p_{i-1}$+$obj_{i-1}$, $p_i$+$obj_i$], the network generates an RGB image ($z_i$) and a mask ($m_i$). The RGB and background images are then linearly blended by the generated mask to create the output frame $f_i$. Instead of transforming an entire image to an output image of the same size from a specified domain, in some examples, frame generation network 24 transforms a pose to a character that is localized in a specific part of the output image and embedded in a given, possibly dynamic, background. This is done both by refocusing the discriminator receptive field, and by applying a learned blending mask over the raw image output. In some example, a DensePose network can be configured to provide both the relevant image region and a prior over the blending mask. Notably, focusing the discriminator on the character, may reduce or eliminate the need for feature-enhancing techniques, such as the introduction of a face-GAN or adding a temporal loss, which can be useful for reducing background motion.

The low-level network architecture details of frame generation network are somewhat similar to those of pose prediction network 22, with the following example modifications: (1) the P2F network generates frames with a higher resolution width, e.g. 1024, (2) no conditioning need be applied, i.e., the w layers are replaced by v layers, (3) the network generates two outputs: the raw image data z and a separate blending mask m is generated in parallel to the raw output z, (4) the discriminators are altered to reflect the added focus, and (5) new regularization terms are added to make sure that the masking takes place at the relevant locations.

Figure 8:
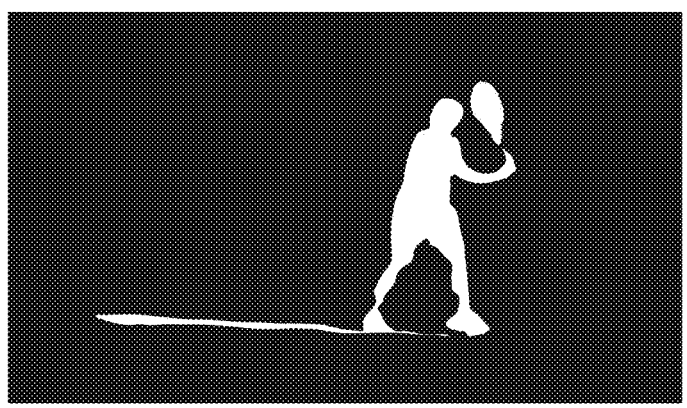
FIG. 8 illustrates example samples of masks that model both the character and places in the scene in which appearance is changed by the character.
Figure 8:

The generated mask m blends the raw output z with the desired background b, rendering the final output frame $f$, according to Eq. 3 (omitting the index i for brevity). Note that some examples the operation of the blending mask is not binary, since various image effects such as shadows, contain both character-derived information and background information, see FIG. 8. For example, FIG. 8 illustrates example samples of masks that model both the character and places in the scene in which appearance is changed by the character. (a) the shadow and the tennis racket of the character are captured by the mask, (b) the shadow of the dancer appears as part of the mask. Note that the belt of the dancer, which is the same color as the background, is modeled by the shadow and not by the generated frame.

Nevertheless, frame generation network 24 is configured to softly encourage the blending mask to favor the background in regions external to the character, and discourage the generator from rendering meaningful representations outside the character. This is done by employing several regularization terms over the generated mask and raw output. As a side effect for these added losses, the network is configured to perform higher-level reasoning and not rely on memorization. In other words, instead of expanding the mask to include all background changes, the network separates between character dependent changes, such as shadows, held items, and reflections, and those that are independent.

Figure 9:
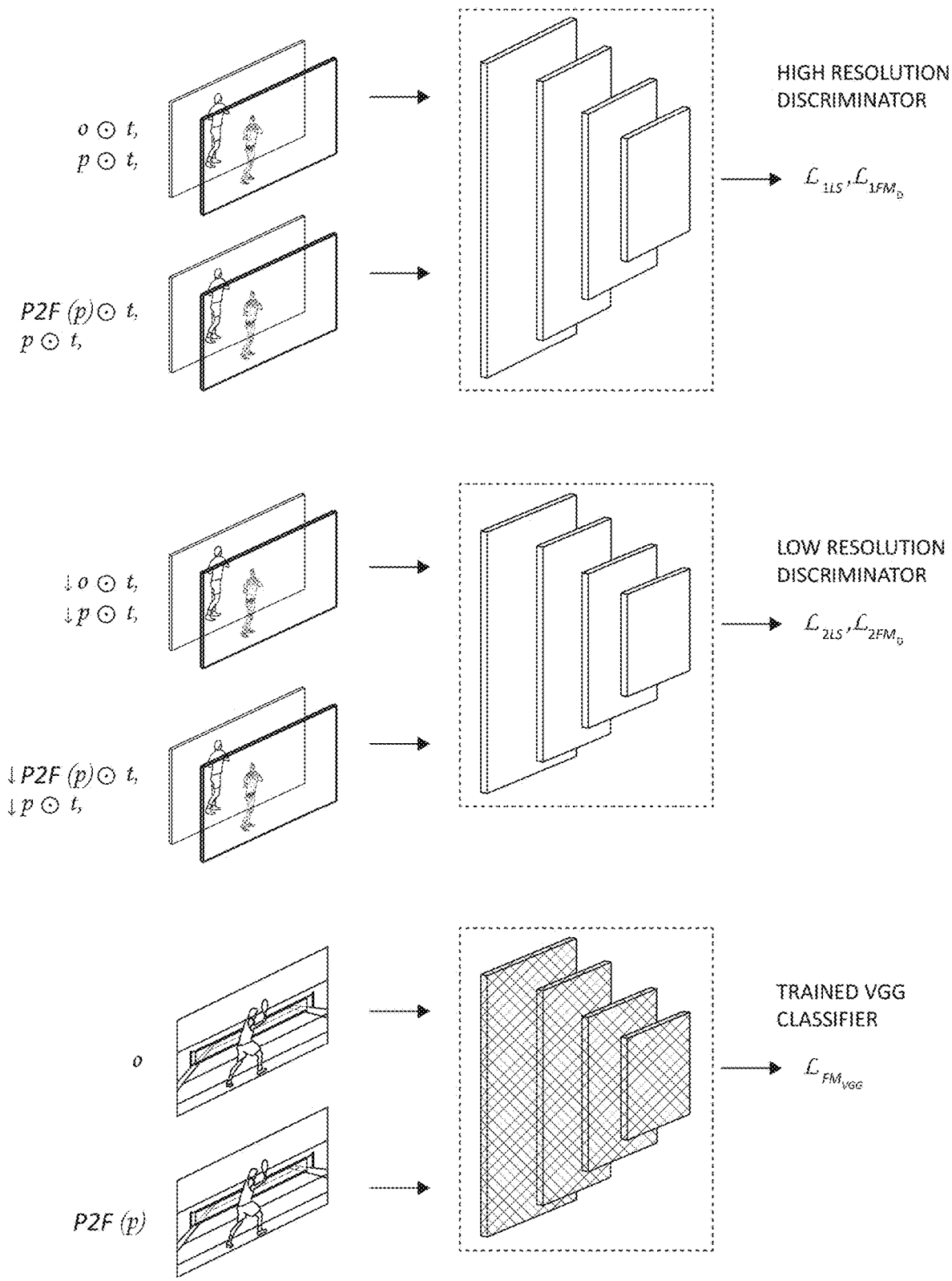
FIG. 9 illustrates in more detail an example setup of the discriminator of frame generation network.

FIG. 9 illustrates in more detail an example setup of the discriminator of frame generation network 24. In general, the discriminator's attention is predominantly shifted towards the character, by cropping the character's detected bounding box, and applying an inverse binary mask over the character. The cropped character is fed into the discriminator, affecting both the multi-scale loss, and the feature matching loss applied over the discriminators' activations. In parallel, the full generated frame is fed into the VGG network, allowing the VGG feature matching loss to aid in the generation of wanted structures external to the character.

More specifically, as shown in FIG. 9, the multi-scale discriminator focuses on the binary-thresholded character, obtained with the binary mask t, as it appears in both the ground truth image o and the output of the P2F network for a given pose and object pair p=[$p_{i-1}$+$obj_{i-1}$,$p_i$+$obj_i$] (or pose p=[$p_{i-1}$,$p_i$] if the object is not included), where the $\downarrow$ denotes downscaling by a factor of two, obtained by average pooling, as applied before the low resolution discriminator. The VGG feature-matching loss term engages with the full frame, covering perceptual context in higher abstraction layers (e.g. generated shadows).

The generator loss term applied to frame generation network 24 can be formulated as:

$$\mathcal{L}_{P2F} = \sum_{k=1}^{2}\left(\mathcal{L}_{LS^k} + \lambda_D \mathcal{L}_{FM_D^k}\right) + \lambda_1 \mathcal{L}_{FM_{VGG}} + \lambda_2 \mathcal{L}_{mask} \quad (16)$$

where $\lambda_1$ and $\lambda_2$ are set during training. The LSGAN generator loss is calculated as:

$$\mathcal{L}_{LS^k} = \mathbb{E}_{(p,t)}\left[(D_k(p \odot t, f \odot t) - 1)^2\right] \quad (17)$$

where p=[$p_{i-1}$+$obj_{i-1}$,$p_i$+$obj_i$] denotes the two pose image (or pose p=[$p_{i-1}$,$p_i$] if the object is not included), and t is the binary mask obtained by thresholding the obtained dense pose image at time i. The discriminator's feature matching loss is calculated as:

$$\mathcal{L}_{FM_D^k} = \mathbb{E}_{(p,o,t)}\sum_{j=1}^{M}\frac{1}{N_j}\left\|D_k^{(j)}(p \odot t, o \odot t) - D_k^{(j)}(p \odot t, f \odot t)\right\|_1 \quad (18)$$

where M being the number of layers, $N_j$ the number of elements in each layer, and o is the real (ground truth) frame. The VGG featurematching loss is calculated over the full ground truth frames, rather than the ones masked by t :

$$\mathcal{L}_{FM_{VGG}} = \sum_{j=1}^{M}\frac{1}{N_j}\left\|VGG^{(j)}(o) - VGG^{(j)}(f)\right\|_1 \quad (19)$$

with o being the ground truth frame, $N_j$ being the number of elements in the j-th layer, and, as before, VGG $^{(j)}$ the VGG activations of the j-th layer.

Figure 10:
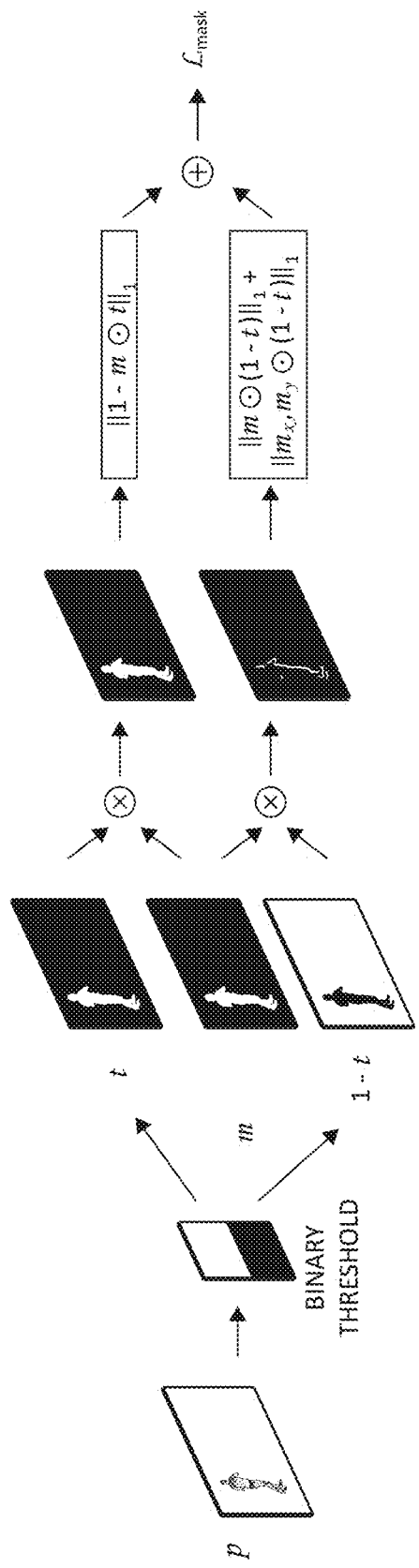
FIG. 10 is a logical flow diagram illustrating a technique applied during training of frame generation network to mask losses in accordance with techniques described herein.

FIG. 10 is a logical flow diagram illustrating a technique applied during training of frame generation network 24 to generate a learned blending mask and raw output frame for a given pose. As shown, an inverse binary-thresholded mask is used to penalize pixel intensity for both the generated blending mask and the raw output frame, in the regions excluding the character of interest. For the generated blending mask, regularization is applied over the derivatives in the x and y axes as well, to encourage smooth mask generation, and discourage high-frequency pattern generation.

The mask term penalizes the mask, as is illustrated in FIG. 10:

$$\mathcal{L}_{mask}=\|m\odot(1-t)\|_1+\|m_x\odot(1-t)\|_1+\|m_y\odot(1-t)\|_1+\\\|1-m\odot t\|_1 \quad (20)$$

where m is the generated mask, $m_x$ and $m_y$ are the mask derivatives in the x and y axes respectively, and z is the raw output frame. The first term acts to reduce the mask's activity outside the regions detected by dense pose. The mask, however, is required to be on in such regions, e.g., to draw shadows. Similarly, the change in the mask is reduced outside the pose detected region, in order to eliminate secluded points there. Finally, a term is added to encourage the mask to be on in the image regions occupied by the character.

The loss applied to the two discriminators is given by:

$$\mathcal{L}_{D^k} = \frac{1}{2}\mathbb{E}_{(p,t)}\left[(D_k(p\odot t, f\odot t))^2\right] + \\ \frac{1}{2}\mathbb{E}_{(p,o,t)}\left[(D_k(p\odot t, o\odot t)-1)^2\right] \quad (21)$$

As mentioned, the mask regularization weight is gradually increased during training of the frame generation model of frame generation network 24 (linear in the epoch number), so as to gradually minimize the memorization of regions outside the character of interest.

Figure 11:
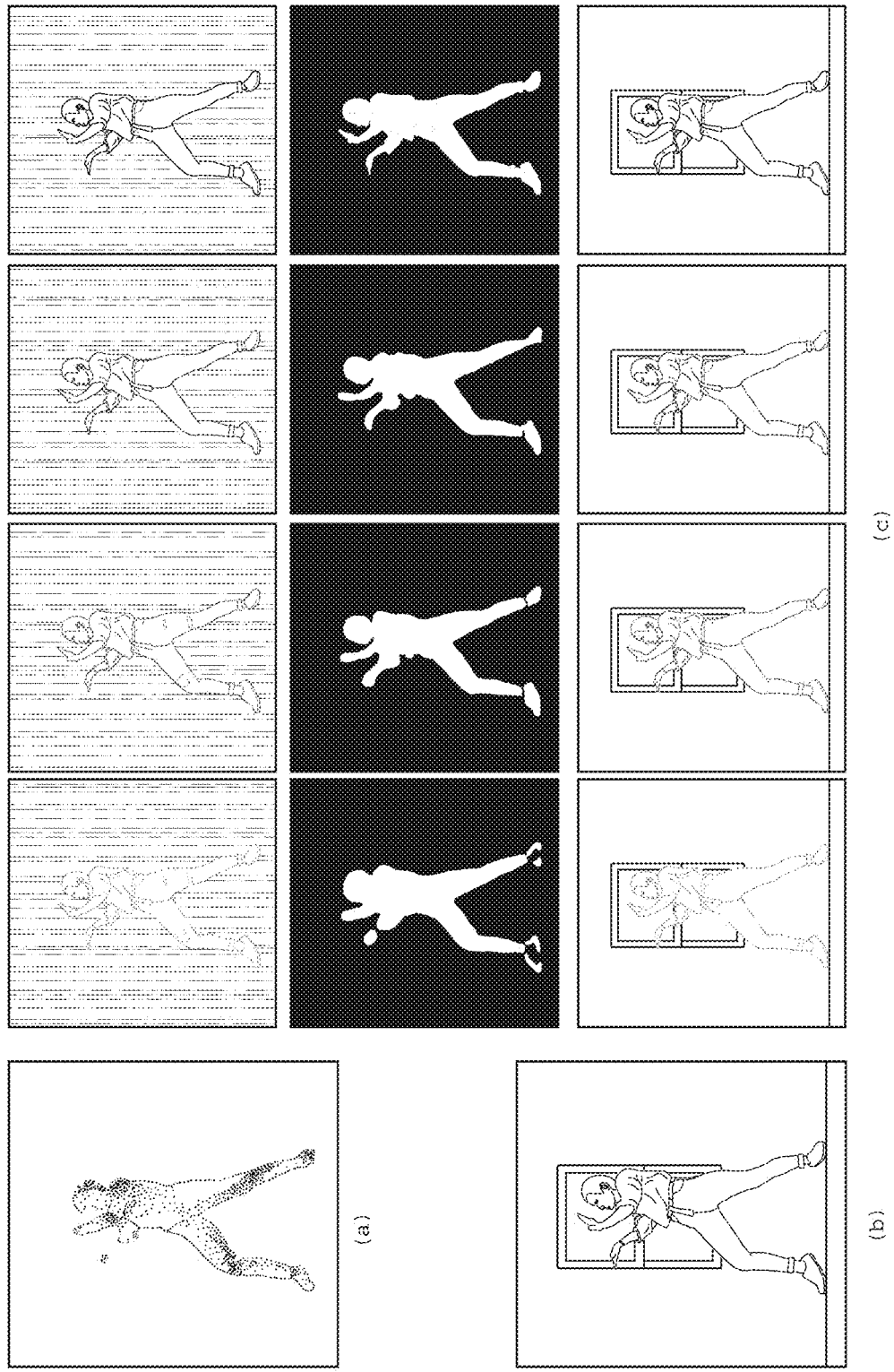
FIG. 11 is a series of images illustrating an example progression during training frame generation network for training a pose-to-frame dancer model.

FIG. 11 is a series of images illustrating an example progression during the training phase of frame generation network 24 for training a pose-to-frame dancer model. In particular, for this training example, FIG. 11 illustrates: (a) a sample pose, (b) the target frame, (c) the generated raw frame, the mask, and the output frame at different epochs: 10, 30, 50, and 200 (final). As training progresses, the details of the dancer become sharper and the air becomes part of the blending mask, despite being outside the densepose detected area (i.e., off pixels in t).

Figure 12:
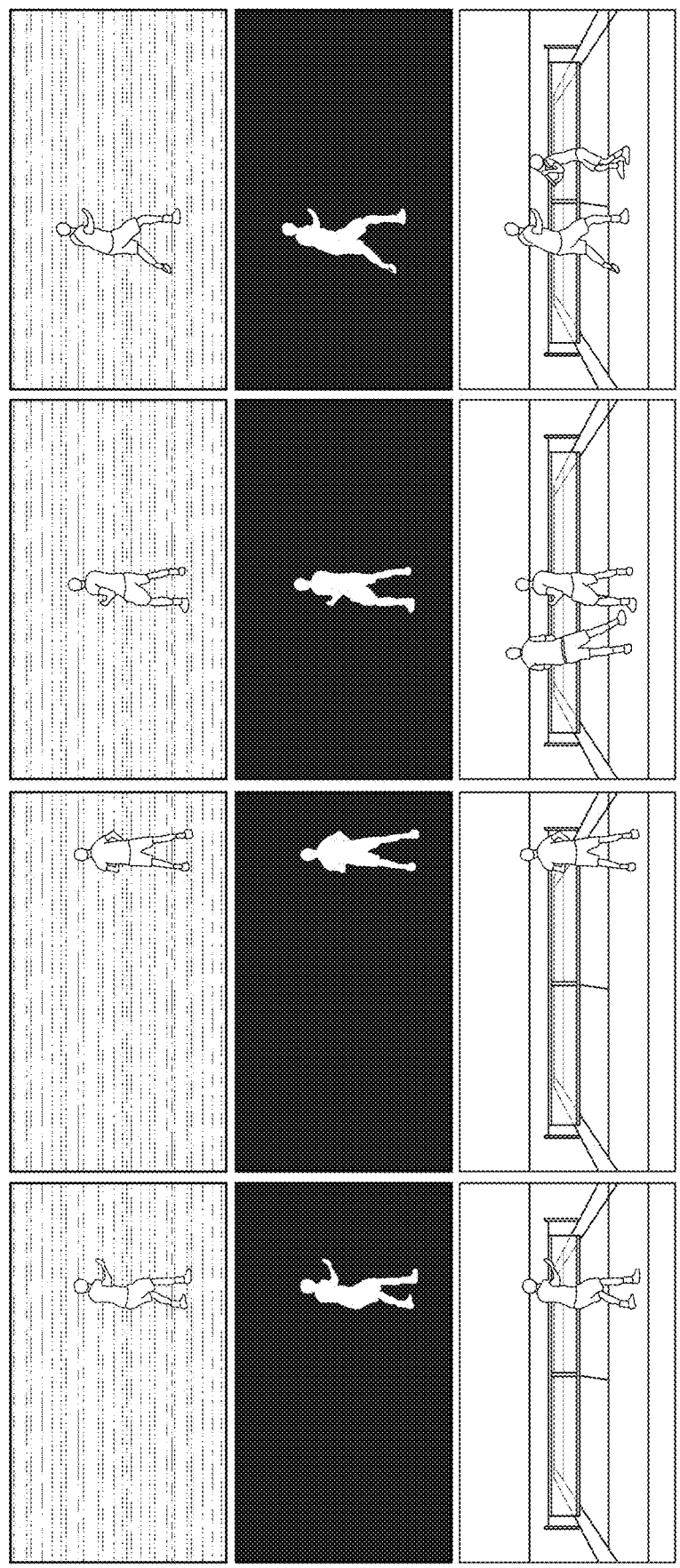
FIG. 12 illustrates one example of a sequence of video frames generated for different backgrounds for a controllable tennis character provided by an example input video.

FIG. 12 illustrates additional examples of a sequence of video frames generated for different backgrounds (static or dynamic) for the controllable tennis character described above with respect to FIG. 4, which depicts the controller signal used to drive the pose, as well as the generated pose $p_i$, mask $m_i$, raw frame $z_i$, and output frame $f_i$. FIG. 12 depicts additional results, in which the extracted tennis character is placed on a diverse set of backgrounds containing considerable motion. In particular, in FIG. 12, each column shows results for a different pose and a different background. The top row is the generated raw frame z, the middle is the blending mask m and the bottom is the resulting frame f.

Figure 13:
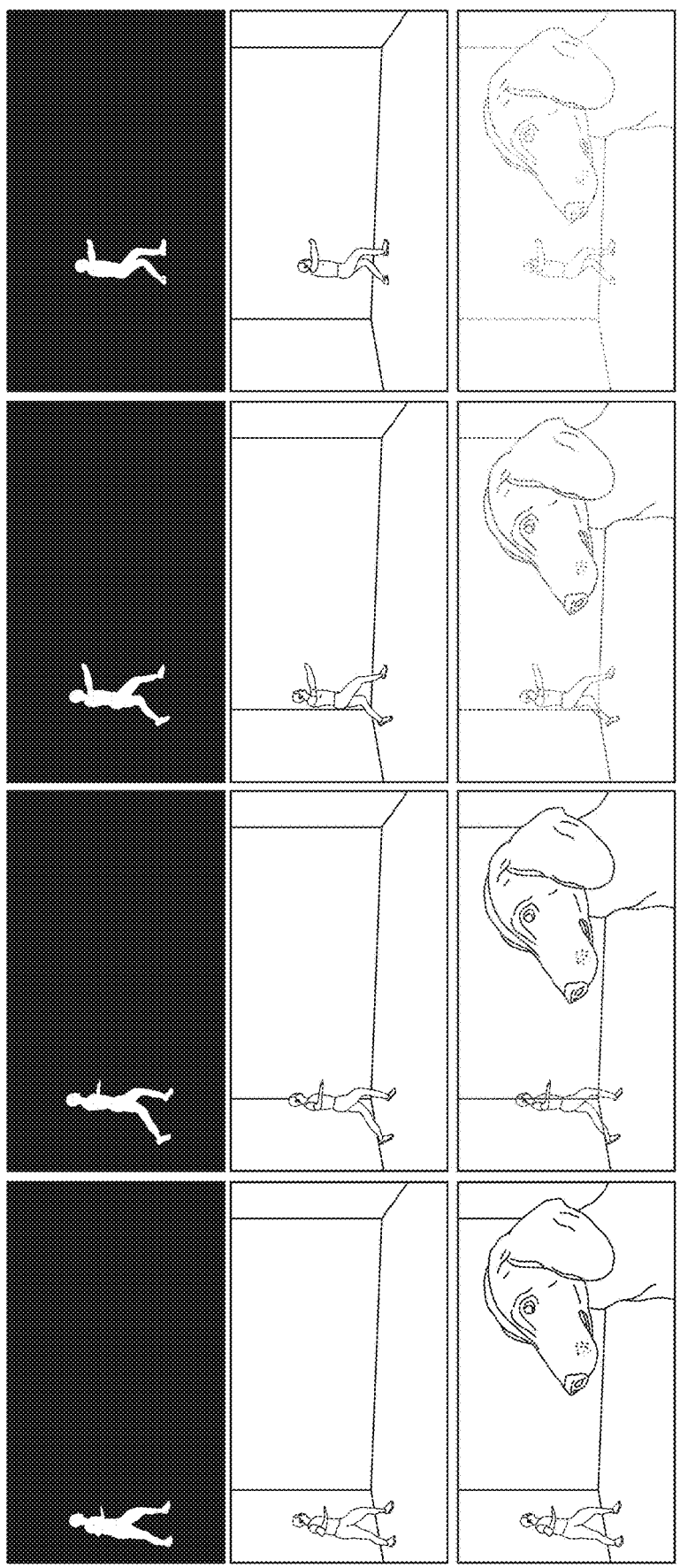
FIG. 13 illustrates one example of a sequence of video frames generated for the controllable fencing character provided by an example input video.

FIG. 13 illustrates a similar example output video generated for a controllable fencing character. The mask for various frames in the controlled sequence is shown, as well as two backgrounds: the background of the reference video, and an animated background. In FIG. 13, each column is a different pose. The rows are the obtained mask, and the placement on two different backgrounds: the one obtained by applying a median filter to the reference video and one taken from a motion picture.

Figure 14:
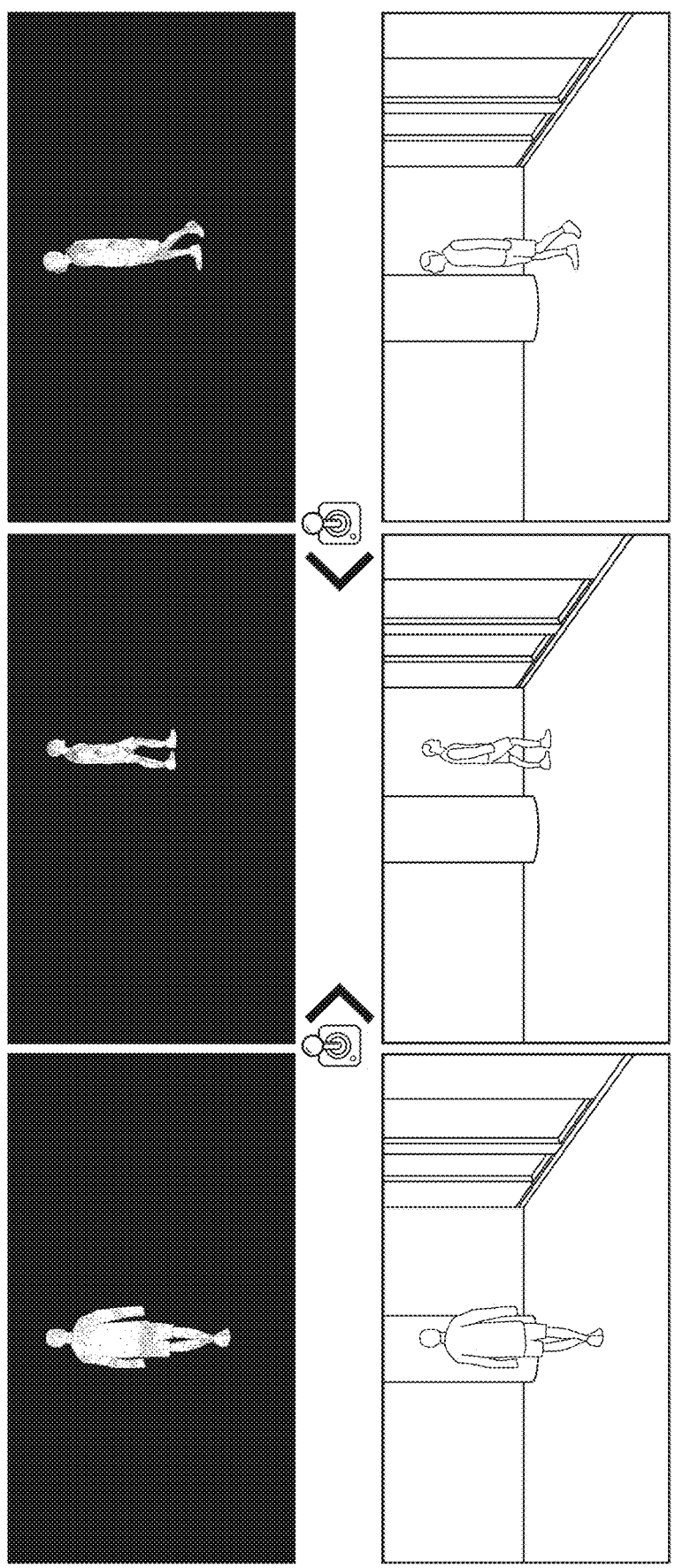
FIG. 14 illustrates the techniques described herein for synthesizing a walking character, emphasizing the control between the frames.

FIG. 14 depicts the controlled walking character along with the control signal and the generated poses. FIG. 14 illustrates the techniques described herein for synthesizing a walking character, emphasizing the control between the frames. Shown are the sequence of poses generated in an autoregressive manner, as well as the generated frames.

Techniques are described for extracting a character or other object from an uncontrolled video sequence and then re-animating it, on any background, according to a 2D control signal. As described herein, the techniques utilize a first neural network that enables the creation of long sequences of detailed coarsely-controlled poses in an autoregressive manner. These poses are then converted into a video sequence by a second neural network, in a manner that enables the careful handling and replacement of the background, which can be crucial for many applications.

The techniques described herein have many practical applications, such as realistic and personalized games, training videos, artificial reality, and the like, which can be created casually from everyday videos. As a result, controllable characters extracted from online videos can find their place in the virtual world and play a role in augmented realities. For example, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A video generation system comprising:
    a pose prediction neural network trained to generate, in response to a motion control input, a sequence of poses of a character and objects, wherein each of the poses of the character comprises image data representing a pose for the character and each of the objects comprises image data representing an object, and wherein the pose prediction neural network comprises a pose model trained with (i) a set of character pose training images extracted from an input video, (ii) a set of object images extracted from the input video, and (iii) a simulated motion control signal computed from the input video; and
    a frame generation neural network trained to generate output video frames that render the character and the object within a scene.

2. The video generation system of claim 1, further comprising:
    a video processor configured to process the input video to extract the character pose training images from the input video by separating image data associated with the character from background image data for a plurality of frames of the input video,
    wherein the video processor is configured to process the input video to extract the object images from the input video by separating image data associated with the object from the background image data for the plurality of frames of the input video.

3. The video generation system of claim 1, further comprising:
    a video processor configured to process the input video to compute the simulated motion control signal as a sequence of two-dimensional displacement vectors representing changes to a center of mass for the character over the character pose training images.

4. The video generation system of claim 1, wherein the pose prediction neural network comprises a plurality of residual blocks conditioned by linear projection of the motion control input.

5. The video generation system of claim 1, wherein the pose model of the pose prediction neural network is configured to apply autoregression to compute a next pose for the character based on a current pose for the character and the motion control input.

6. The video generation system of claim 1, wherein the pose prediction neural network comprises a down-sampling encoder to generate the set of character pose training images as down-sampled lower-resolution images from the image data extracted from the input video to efficiently train the pose model of the pose prediction neural network.

7. The video generation system of claim 1, the video generation system configured to:
    process the input video to extract pose information from each of a set of frames of the input video to generate the character pose training images, the pose information comprising image data of the character for the set of frames of the input video;
    apply a binary threshold over the character pose training images to create a binary mask of the character for each of the character pose training images;
    determine a pixel location of a center of mass of the character as a coordinate within each of the character pose training images; and
    determine the simulated motion control signal as changes to the pixel location of the center of mass between each consecutive pair of the character pose training images; and apply the simulated motion control signal and the character pose training images as inputs to train the pose model.

8. The video generation system of claim 1, wherein the frame generation neural network is configured to:
    receive, as input, the sequence of poses of the character and the objects generated by the pose prediction neural network in response to the motion control signal;
    generate, for the sequence of poses and objects and from a frame generation model, a sequence of raw image frames depicting respective poses of the character and the objects and a set of respective blending mask images; and
    generate the output video as a sequence of composite images by application of each blending mask image to a background image and the corresponding raw image frame.

9. The video generation system of claim 8, wherein the set of blending mask images comprise a sequence of spatial masks configured to determine which regions of the background image are replaced by image data from the raw image frame produced by the frame generation neural network.

10. The video generation system of claim 8, wherein the frame generation model of the frame generation neural network is trained, using (i) the set of character pose training images extracted from the input video and (ii) the set of object images extracted from the input video, to learn the set of blending masks and the raw output frames.

11. The video generation system of claim 8,
    wherein the frame generation neural network comprises a multi-scale discriminator that is trained to discriminate between visual effects in the input video that are due to the character and visual effects that are independent from the character, and
    wherein the frame generation neural network generates the blending mask to prioritize inclusion of character-based effects on the background within the composite image and to exclude character-independent effects on the background.

12. The video generation system of claim 1, wherein the simulated motion control signal is representative of changes to a position for the character over the character pose training images.

13. A method comprising:
    generating, with a pose prediction neural network and in response to a motion control input, a sequence of poses of a character and objects, wherein each of the poses of the character comprises image data representing a pose for the character and each of the objects comprises image data representing an object, and wherein the pose prediction neural network comprises a pose model trained with (i) a set of character pose training images extracted from an input video, (ii) a set of object images extracted from the input video, and (iii) a simulated motion control signal computed from the input video; and generating, with a frame generation neural network, output video frames that render the character and the object within a scene.

14. The method of claim 13, further comprising:
processing the input video to extract the character pose training images from the input video by separating image data associated with the character from background image data for a plurality of frames of the input video, and processing the input video to extract the object images from the input video by separating image data associated with the object from the background image data for the plurality of frames of the input video.

15. The method of claim 13, further comprising processing the input video to compute the simulated motion control signal as a sequence of two-dimensional displacement vectors representing changes to a center of mass for the character over the character pose training images.

16. The method of claim 13, wherein generating a sequence of poses of a character comprises applying autoregression with the pose model of the pose prediction neural network to compute a next pose for the character based on a current pose for the character and the motion control input.

17. The method of claim 13, further comprising:
processing the input video to extract pose information from each of a set of frames of the input video to generate the character pose training images, the pose information comprising image data of the character for the set of frames of the input video;

applying a binary threshold over the character pose training images to create a binary mask of the character for each of the character pose training images;

determining a pixel location of a center of mass of the character as a coordinate within each of the character pose training images;

determining the simulated motion control signal as changes to the pixel location of the center of mass between each consecutive pair of the character pose training images; and applying the simulated motion control signal and the character pose training images as inputs to train the pose model.

18. The method of claim 13, further comprising:
receiving, as input, the sequence of poses of the character and the objects generated by the pose prediction neural network in response to the motion control signal;

generating, for the sequence of poses and objects and from a frame generation model, a sequence of raw image frames depicting respective poses of the character and the objects and a set of respective blending mask images; and generating the output video as a sequence of composite images by application of each blending mask image to a background image and the corresponding raw image frame.

19. The method of claim 13,
wherein generating the sequence of poses of the character further comprises generating, in response to the motion control input, a sequence of pairs of poses of the character and an object, wherein each of the pairs comprises image data representing a pose for the character and representing the object, and wherein the pose model is further trained with (iii) a set of object images extracted from the input video, and wherein generating the output video frames comprises generating output video frames that render the character and the object within the scene.

20. A non-transitory computer-readable storage medium comprising instructions that configure one or more programmable processors to:

process an input video to extract a set of character pose training images from an input video of a character by separating image data associated with the character from background image data for a plurality of frames of the input video;

process the input video to extract the object images from the input video by separating image data associated with the object from the background image data for the plurality of frames of the input video;

process the input video to compute a simulated motion control signal as a sequence of two-dimensional displacement vectors representing changes to a center of mass for the character over the character pose training images;

apply, as inputs, (i) the set of character pose training images extracted from the input video, (ii) a set of object images extracted from the input video, and (iii) the simulated motion control signal computed from the input video to train a pose model of a pose prediction neural network;

generate, with the pose prediction neural network and in response to a motion control input from a user, a sequence of poses of a character and objects, wherein each of the poses of the character comprises image data representing a pose for the character and each of the objects comprises image data representing an object; and generate, with a frame generation neural network, output video frames that render the character and the object within a scene.

* * * * *